US006006617A

United States Patent [19]

Pawlik

[11] Patent Number: 6,006,617

[45] Date of Patent: Dec. 28, 1999

[54] STARTER FOR A MOTOR VEHICLE ENGINE, HAVING IMPROVED SEALING MEANS

[75] Inventor: Hugues Pawlik, Lyons, France

[73] Assignee: Valeo Equipements Electriques Moteur, Creteil, France

[21] Appl. No.: 08/707,337

[22] Filed: Sep. 3, 1996

[30] Foreign Application Priority Data

Sep. 4, 1995 [FR] France .................................. 95 10415

[51] Int. Cl.[6] ............................ F02N 15/06; F16J 15/44; F16J 15/32

[52] U.S. Cl. ................................ 74/7 A; 74/7 C; 277/25; 277/152

[58] Field of Search ............................. 74/7 R, 7 A, 7 E, 74/7 C; 277/25, 152

[56] References Cited

U.S. PATENT DOCUMENTS

| | | | |
|---|---|---|---|
| 2,418,707 | 4/1947 | Groot | 277/25 |
| 2,936,715 | 5/1960 | Southam et al. | 277/25 X |
| 4,465,285 | 8/1984 | Toyoda et al. | 277/25 |
| 4,958,530 | 9/1990 | Jascek et al. | 74/7 A |
| 4,995,275 | 2/1991 | Okamoto et al. | 74/7 A |
| 5,054,329 | 10/1991 | Morishita et al. | 74/7 A X |

FOREIGN PATENT DOCUMENTS

| | | | |
|---|---|---|---|
| 249981 | 5/1963 | Australia | 277/25 |
| 2 256 900 | 12/1992 | United Kingdom . | |

OTHER PUBLICATIONS

French Search Report, May 31, 1996.

*Primary Examiner*—Allan D. Herrmann
*Attorney, Agent, or Firm*—Morgan & Finnegan, L.L.P.

[57] ABSTRACT

A motor vehicle starter has a starter head which is driven in rotation by a motor shaft and which is displaceable in sliding movement between a rest position and a working position, with the starter head projecting outside the starter casing. A sealing gasket is arranged on the starter head and comprises a seal body which is fitted on the latter in front of an external transverse face of the casing. The seal body carries a frusto conical lip which is joined at its leading end to the seal body. The lip extends axially towards the rear so that its free terminal edge is in contact with the external transverse face of the casing over the whole periphery of the aperture in the casing, but only when the starter head is in its rest position.

5 Claims, 2 Drawing Sheets

STARTER FOR A MOTOR VEHICLE ENGINE, HAVING IMPROVED SEALING MEANS

FIELD OF THE INVENTION

This invention relates to starters for internal combustion engines for motor vehicles. More particularly, the invention relates to a motor vehicle starter having three main features, each known per se. The first of these features is that the starter comprises a starter head which is arranged to be driven in rotation about its axis by a motor shaft of the starter, and which is adapted to slide axially between a retracted or rest position and a deployed or working position. The second of the said features is that the starter head extends outside the casing of the starter, via a circular through aperture formed in an external transverse face of the starter casing. Finally, the third one of the said features is that the starter includes a sealing gasket which is arranged on the starter head, and which cooperates with the said external transverse face of the starter casing.

BACKGROUND OF THE INVENTION

In order to provide sealing in the region of the aperture in the external transverse face of the casing, through which the starter head extends, it is known to employ a seal having a lip giving radial frictional contact, the lip being fixed on the casing of the starter around the aperture, with a lip of the seal bearing on a cylindrical engagement surface of the starter head.

This arrangement has the disadvantage that it leaves the lip of the seal in permanent contact with the engagement surface of the starter head. Thus, when the starter head is displaced axially from its rest position towards its working position, the friction of the lip of the seal on the cylindrical engagement surface of the starter head acts as a brake on the displacement of the head. This can cause the starter motor, and therefore the starter head, to be put into rotation before the starter pinion of the head has become properly meshed with the toothed starter crown carried by the inertia flywheel of the engine of the vehicle.

In addition, when the starter head is rotating about its axis, the lip of the seal continues to rub frictionally against the starter head; moreover, this friction is produced at high speed, which leads to rapid deterioration of the lip and thus results, before long, in poor sealing.

With a view to overcoming the first of these problems, it has been proposed to provide a sealing gasket of the flat type, which is adapted to engage, when the starter head is in its rest position, against the external transverse face of the casing of the starter. This arrangement does however having the disadvantage that it makes it necessary for the flat sealing gasket to act as an axial positioning abutment for the starter head in the rest position, so as to achieve good contact of the flat seal on the said external transverse face, regardless of the geometric variations which are inherent in the construction of the starter.

With that arrangement, when the starter head returns from its working position to its rest position after having started the engine of the vehicle, but while it is still rotating about its axis at a high speed, the flat gasket is in frictional movement against the external transverse face of the casing. This arrangement therefore does not resolve the problem of wear of the seal due to friction.

DISCUSSION OF THE INVENTION

Accordingly, an object of the invention is to propose means for sealing a starter in a more simple and reliable way.

According to the invention, a motor vehicle starter, of the type comprising a starter head which is adapted to be driven in rotation about its axis by a motor shaft of the starter, and which is adapted to slide axially between a retracted rest position and a deployed working position, being of the type in which the starter head extends outside a casing of the starter through a circular aperture formed in an external transverse face of the casing, and being also of the type comprising a sealing gasket which is arranged on the starter head, and which cooperates with the external transverse face of the casing, is characterised in that the sealing gasket comprises a seal body which is fitted on the starter head in front of the external transverse face, and which includes a substantially frusto-conical lip which is joined to the seal body along the peripheral edge of the lip that defines the smaller diameter of the truncated cone of the lip, the lip extending axially rearwardly from that edge so that the other, or free terminal, edge of the lip, defining the larger diameter of the truncated cone, is in contact with the said external transverse face over the whole periphery of the said aperture when the starter head is in its retracted or rest position.

According to a preferred feature of the invention, the frusto-conical lip is made of a flexible material such that, under the effect of centrifugal force due to rotation of the starter head about its axis, the lip is deflected radially outwards by pivoting about its junction on the seal body, and thus becomes spaced axially away from the said external transverse face of the casing.

According to another preferred feature of the invention, the starter head includes a free wheel device, an inner ring of which is coupled in rotation to the motor shaft of the starter, with an outer ring of the free wheel device being coupled to a starter pinion, the sealing gasket being fitted over the outer ring of the free wheel device.

The gasket is preferably made by moulding in a plastics material or an elastomeric material.

The seal body and the frusto-conical lip are preferably made by moulding in two materials.

The sealing gasket is preferably fitted elastically on to the outer ring of the free wheel device, so as to closely embrace the latter.

The invention also provides an internal combustion engine for a motor vehicle, the engine having an engine block carrying a bearing in which a free end of the starter head is mounted.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 2:
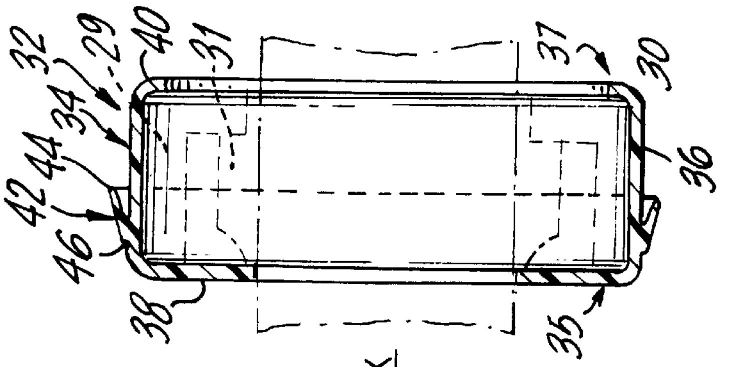
FIG. 2 is a view in axial cross section of a sealing gasket in accordance with the preferred embodiment.
Figure 1:
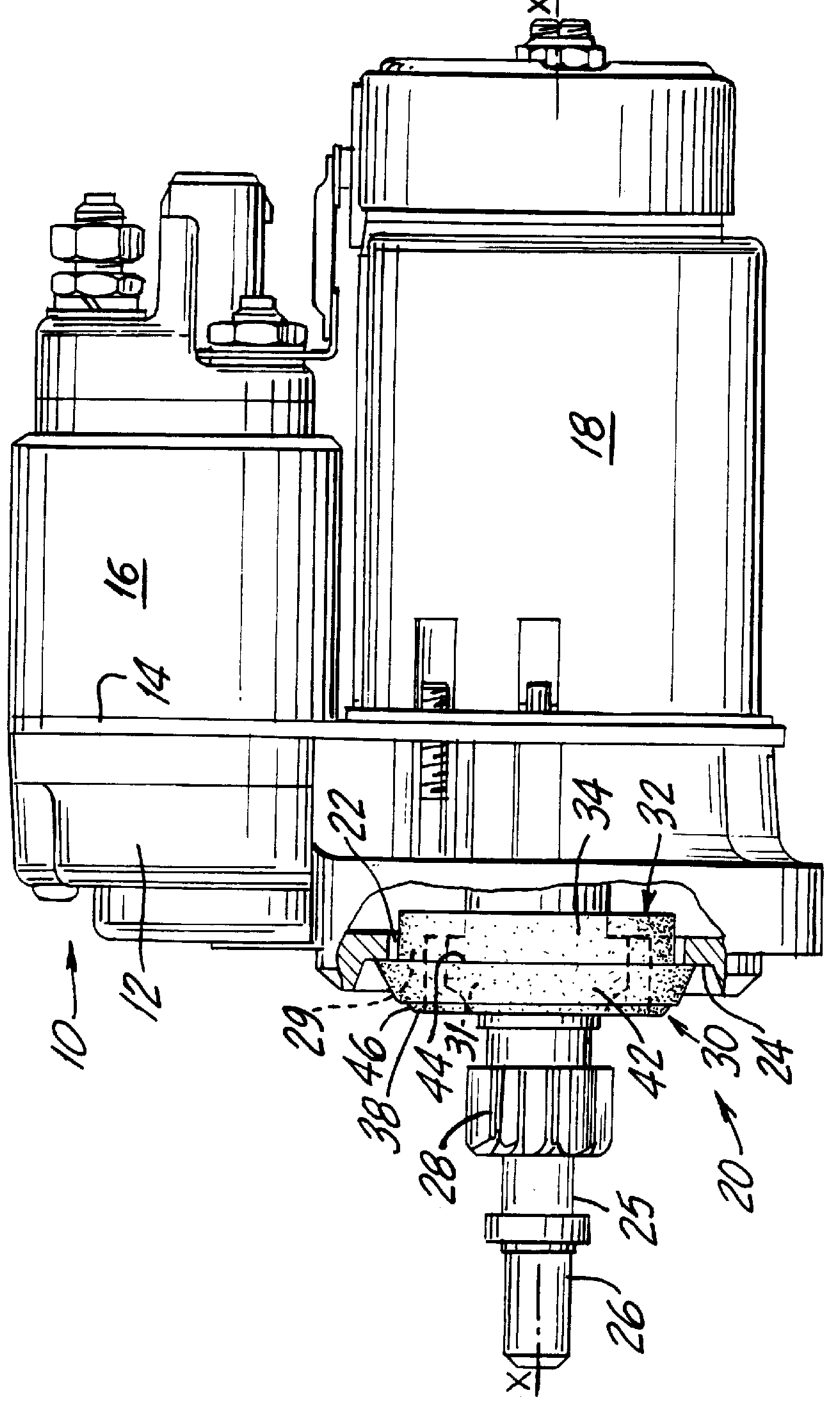
FIG. 1 is a side view, shown partly cut away, of a starter in accordance with the preferred embodiment.

The starter shown in FIG. 1 at 10 comprises a main casing 12 having a rear face 14. A contactor 16 and a starter motor 18 are fixed on the rear face 14. The axis of the motor 18 is indicated at X—X. The starter motor 18 is arranged to drive a starter head 20 in rotation about the axis X—X. The starter head 20 extends axially through an aperture 22 formed through a transverse outer face 24 in the front of the motor casing 12.

The starter head 20 has a starter pinion 28 which is arranged, in the usual way, to mesh with a starter crown 15 carried by an inertia flywheel of the internal combustion engine of the vehicle that is equipped with a starter 10. The embodiment of the starter 10 shown in FIG. 1 is a starter of the "suspended pinion" type, that is to say the type in which the starter head is guided at a first one of its axial ends (not shown) in the starter casing 12 itself, with the free second axial end 26 of the starter head located along motor shaft 25 being supported in a bearing 13 and which is arranged for example on the cylinder block or the crankshaft casing of the engine 11.

A starter of this type does not call for an additional component fixed to the front cover of the starter casing. Such an additional support member would include a bearing 13 for guiding the free end 26 of the starter head, and would also have an aperture for enabling the starter pinion 28 to mesh on the starter crown or toothed wheel of the inertia flywheel. However, in both of these two types of starter, the problem arises of how to provide effective sealing around the aperture 22 through which the starter head 20 extends.

In this connection, apart from its rotation, the starter head 20 is liable to become axially displaced from a retracted or rest position, which is shown in FIG. 1, towards a working or deployed position in which the starter pinion 28 is meshed on the starter crown.

It has been found that it is in fact necessary to provide sealing around the aperture 22 only when the starter and the starter head 20 are at rest. In this connection, when the starter head is in its working position, it is driven in rotation about its axis X—X, which causes a centrifugal flow of air to occur. This air flow is sufficiently powerful to prevent any penetration of water or dirt into the interior of the casing 12 via the aperture 22.

The starter head 20 also includes a roller-type free wheel device 30, having an outer ring 29 which is coupled to the starter head 20, and an inner ring 31 which is coupled in rotation to the starter motor 18.

In order to provide proper sealing around the aperture 22 when the starter head 20 is in its rest position, the starter 10 includes a sealing gasket 32 which is fitted on the starter head so as to embrace the outer ring 29 of the free wheel device 30 coupled to the starter pinion 28. The sealing gasket 32 thus covers the free wheel device 30.

The gasket 32 comprises a seal body 34 in the form of a cylindrical skirt portion 36 which has, at each of its axial ends 35 and 37, an inwardly extending transverse flange 38 and 40 respectively. These flanges enable the sealing gasket 32 to be positioned axially on the outer ring 29 of the free wheel device 30. One of the transverse flanges, namely the flange 40, is of sufficiently small dimensions to enable the sealing gasket 32 to be fitted axially on to the free wheel device 30, by virtue of the elasticity of the material of which the seal body 34 is made.

In the vicinity of its leading axial end 35, the cylindrical skirt portion 36 of the sealing gasket 32 has an integral, frusto-conical lip 42 which projects on the outside of the gasket 32 and which is oriented obliquely towards the rear, i.e. towards the external transverse face 24 of the starter casing 12. The truncated cone defining the lip 42 has its larger diameter at a rear or free edge 44 of the lip, and its smaller diameter at the front end of the latter at which the lip is joined, at 46, to the seal body 34.

As can be seen in FIG. 1, when the starter head 20 is in its rest position, the lip 42 bears against the outer face 24 through its peripheral free edge 44, and thus provides good sealing around the aperture 22.

The lip 42 is made of a suitable flexible material, such that it is able to become slightly deformed in an axial direction in such a way as to compensate for the inevitable geometric dispersions which affect the axial position of the starter head 20 in the rest position.

In addition, due to the flexibility of its material, the frusto-conical lip 42 is able, when the starter head 20 is in rotation about its axis X—X, to be deflected radially outwardly under the effect of centrifugal force, so that it becomes axially disengaged from the external transverse face 24 of the casing 12, by pivoting about the junction 46 between the lip 42 and the seal body 34.

Figure 3:
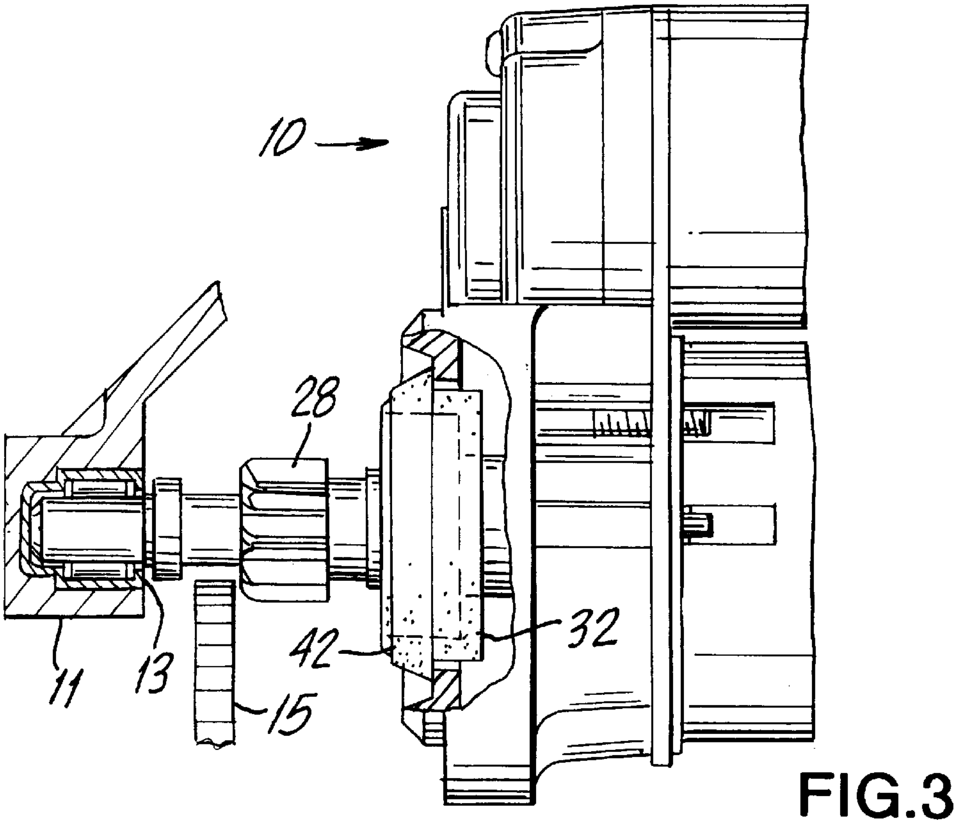
FIG. 3 is a side view, shown partly cut away, of a starter in rest position in accordance with the preferred embodiment.
Figure 4:
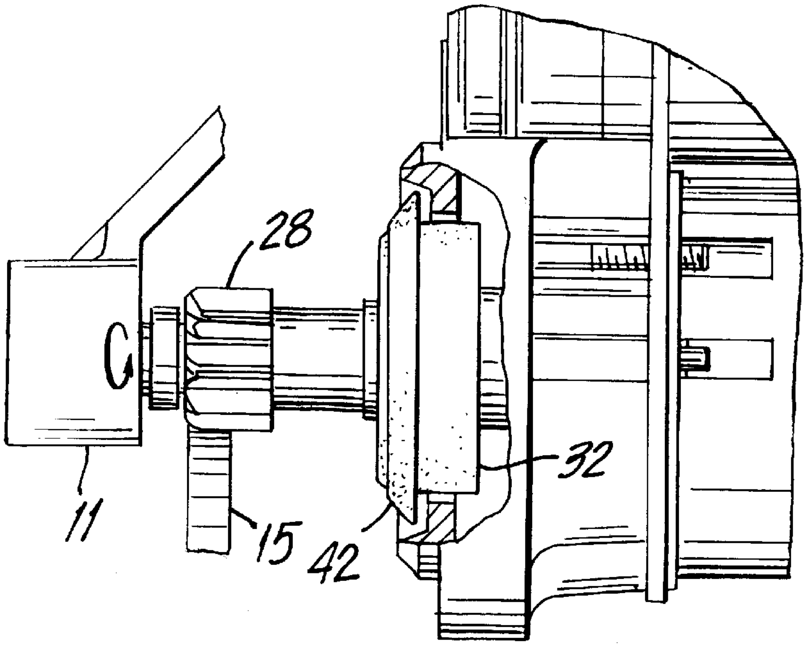
FIG. 4 is a side view, shown partly cut away, of a starter in working position in accordance with the preferred embodiment.
Figure 5:
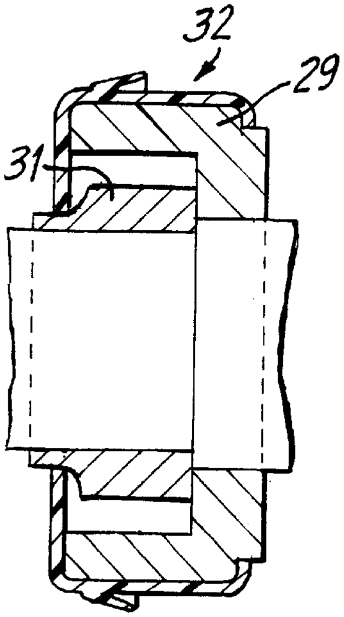
FIG. 5 is a cross-sectional view of the sealing gasket showing the inner and outer rings in accordance with the preferred embodiment.

In operation of the starter, the starter head 20 is first displaced axially from its rest position as shown in FIG. 3 to its working position as shown in FIG. 4, so that the starter pinion 28 becomes meshed with the starter crown 15 on the flywheel. Thus, when the starter motor 18 starts to drive the starter head 20 in rotation about its axis X—X, the lip 42 is already out of contact with the outer transverse face 24 of the starter casing.

Once the engine of the vehicle has been started, and when the starter head 20 returns from its working position to its rest position, the free wheel device 30 causes the starter head to be rotated about its axis X—X, which causes the lip 42 to be displaced outwardly as described above, in such a way that, when the starter head 20 comes once again into its rest position, the sealing lip 42 does not make contact with the outer transverse face 24 until the rotational velocity of the starter head 20 diminishes below a threshold value which depends, among other factors, on the flexibility of the sealing lip 42.

The sealing gasket 32 is made by moulding in a suitable plastics material, and more particularly in an elastomeric material. However, such a gasket may also be made in a bimetallic material in order to give a seal body 34 which is more rigid than the sealing lip 42.

What is claimed is:

1. A motor vehicle starter comprising: a starter casing defining an axis and having a first axial end and a second axial end, with an outer transverse face of the casing at its said second axial end, the external transverse face defining a coaxial through aperture therein: a starter motor carried on the first axial end of the casing, the motor having a motor shaft coaxial with said aperture; a starter head extending through the aperture and projecting out of the casing; coupling means coupling the starter head to the motor shaft for driving of the starter head in rotation by the motor; means supporting the starter head for axial sliding movement of the latter between a retracted rest position and a deployed working position; and a sealing gasket arranged on the starter head for cooperation with the external transverse face of the casing, wherein the gasket comprises a seal body, fitted on the starter head in front of the external transverse face of the casing, and a substantially frusto-conical sealing lip extending outwardly and rearwardly from the seal body, the lip having a front end defining a junction between the lip and the seal body, and a rear end constituting a free edge of the lip, said free edge being of larger diameter than said junction, the lip being disposed in front of the external transverse face of the casing, in a location in which the free edge of the lip is in contact with the transverse face over the whole periphery of the aperture when the starter is in its said retracted position;

wherein the lip is of a flexible material such that, when the starter head is rotated about the axis. the lip is radially deflected in pivoting movement about the junction under centrifugal force, whereby its said free edge is brought out of contact with the transverse face of the casing; and wherein the starter head includes a starter pinion and a free wheel device, the free wheel device constituting the coupling means and having an inner ring and an outer ring, the inner ring being coupled in rotation to the motor shaft and the outer ring being coupled to the starter pinion, the sealing gasket being fitted on the outer ring.

2. A starter according to claim 1, wherein the sealing gasket is fitted elastically on the outer ring of the free wheel device.

3. A motor vehicle combustion engine having a bearing carried on the engine, and a starter according to claim 1 mounted on the engine, the starter head having a free end mounted in the bearing.

4. A starter according to claim 1, wherein the sealing gasket is moulded in a material selected from a plastics material and an elastomeric material.

5. A starter according to claim 4, wherein the seal body and the sealing lip are made in bimaterial moulding.

* * * * *